(12) United States Patent
Kim

(10) Patent No.: US 9,021,266 B2
(45) Date of Patent: Apr. 28, 2015

(54) VALIDATION SYSTEM AND VERIFICATION METHOD INCLUDING SIGNATURE DEVICE AND VERIFICATION DEVICE TO VERIFY CONTENTS

(75) Inventor: Dae Youb Kim, Seoul (KR)

(73) Assignee: Samsung Electronics., Ltd., Suwon-si (KR)

( * ) Notice: Subject to any disclaimer, the term of this patent is extended or adjusted under 35 U.S.C. 154(b) by 699 days.

(21) Appl. No.: 13/267,130

(22) Filed: Oct. 6, 2011

(65) Prior Publication Data

US 2012/0124381 A1 May 17, 2012

(30) Foreign Application Priority Data

Nov. 17, 2010 (KR) ........................ 10-2010-0114645

(51) Int. Cl.
*H04L 9/32* (2006.01)
*H04L 9/06* (2006.01)

(52) U.S. Cl.
CPC ............ *H04L 9/3242* (2013.01); *H04L 9/0643* (2013.01); *H04L 9/3247* (2013.01); *H04L 2209/60* (2013.01)

(58) Field of Classification Search
CPC ............................ G06F 21/64; H04L 2209/38
USPC ........................................................ 713/176
See application file for complete search history.

(56) References Cited

U.S. PATENT DOCUMENTS 7,539,867 B2    5/2009   Bolosky et al.

FOREIGN PATENT DOCUMENTS

| JP | 2004-193942 JP | 7/2004 |
|---|---|---|
| JP | 2007-079989 | 3/2007 |
| KR | 10-2004-0096264 | 11/2004 |
| KR | 10-2005-0045970 | 5/2005 |
| KR | 10-2007-0060087 | 6/2007 |
| KR | 10-2010-0015143 | 2/2010 |

OTHER PUBLICATIONS

Dhungel et al., The Pollution Attack in P2P Live Video Streaming: Measurement Results and Defenses, 2007, Retrieved from the Internet <URL: dl.acm.org/citation.cfm?id=1326324&bnc=1>, pp. 1-6 as printed.*

Wong et al., Digital Signatures for Flows and Multicasts, 1998, Retrieved from the Internet <URL: ieeexplore.ieee.org/xpls/abs_all.jsp?arnumber=723740>, pp. 1-12 as printed.*

Schneier, Applied Cryptography, second edition, Retrieved from the Internet <URL: www.cse.iitk.ac.in/users/anuag/crypto.pdf>, pp. 1-75 as printed, published 1996.*

(Continued)

*Primary Examiner* — Michael Cho
(74) *Attorney, Agent, or Firm* — NSIP Law

(57) ABSTRACT

Provided are methods and a validation system that includes a signature device and a verification device for verifying a content. The signature device may generate verification information for each segment of a divided content and may generate signature information to verify the integrity of each segment and whether a corresponding segment is a part of a content. When a segment is received, the verification device may verify integrity of the segment and whether the segment is a part of the content, based on the verification information and the signature value received from the signature device.

19 Claims, 11 Drawing Sheets

(56) References Cited

OTHER PUBLICATIONS

Wahid et al.; An Optimal Message Authentication Scheme for Lossy Channels; 2006; Retrieved from the Internet <URL: http://ieeexplore.ieee.org/xpls/abs_all.jsp?arnumber=4136891>; pp. 1-6 as printed.*

Charles Lin (not stated in the reference); The Magic of Xor; 2003; Retrieved from the Internet <URL: cs.umd.edu/class/sum2003/cmsc311/Notes/BitOp/xor.html>; pp. 1-4 as printed.*

Anupam Datta; Process Calculus and Security; 2007; Retrieved from the Internet <URL: ece.cmu.edu/~ece739/2007course/lectures-pdf/10-ProcessCalculus.pdf>; pp. 1-37 as printed.*

* cited by examiner

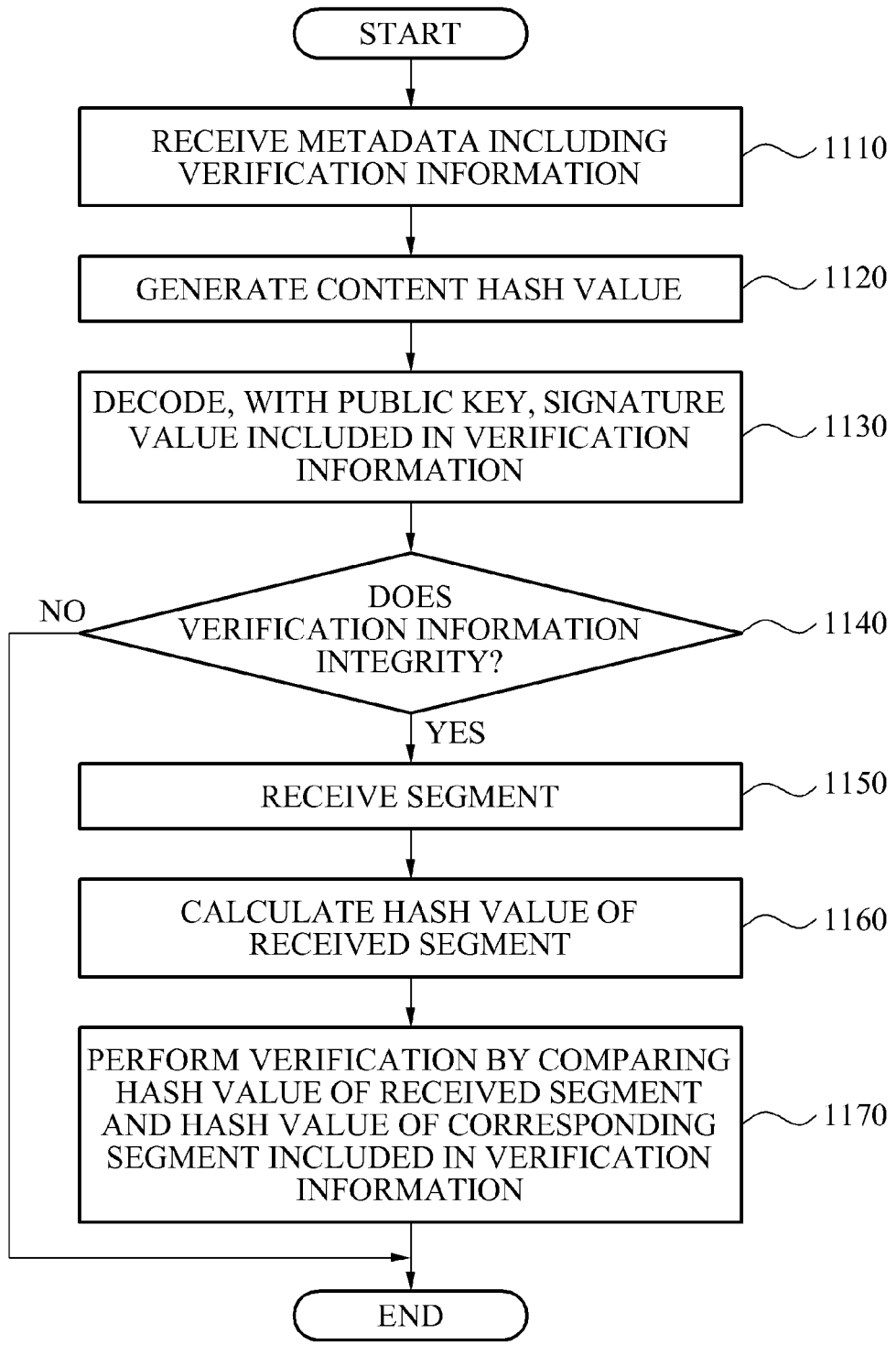

VALIDATION SYSTEM AND VERIFICATION METHOD INCLUDING SIGNATURE DEVICE AND VERIFICATION DEVICE TO VERIFY CONTENTS

CROSS-REFERENCE TO RELATED APPLICATION(S)

This application claims the benefit under 35 U.S.C. §119 (a) of Korean Patent Application No. 10-2010-0114645, filed on Nov. 17, 2010, in the Korean Intellectual Property Office, the entire disclosure of which is incorporated herein by reference for all purposes.

BACKGROUND

1. Field

The following description relates to a high-capacity content service and a high-capacity content sharing method that are based on a network. As the high-capacity content is divided and transmitted, a validation system may verify integrity of each segment of the divided content.

2. Description of Related Art

A digital signature is one of a plurality of representative schemes that may be used to authenticate a source of data that is transmitted via a network and may provide data integrity. The digital signature may compress data using a one-way hash function to compress the date to be a predetermined size, and may perform a predetermined operation using a private key of a user. The private key may be a signature key through a public key cryptosystem that is used to generate a signature value. The signature value may be verified based on the corresponding public key.

In general, a high capacity multi-media file may be divided into fragments or segments that are a predetermined size through a fragmentation process to transmit the high capacity multi-media file. The fragments of the divided multi-media file may be separately stored and managed in a plurality of hosts, for example, in a distribution structure such as a Peer-to-Peer (P2P) structure. However, one or more of the segments may be forged or falsified during a cache and forward process. To detect the forgery or falsification, a scheme that includes a digital signature of a publisher in a multi-media file has been proposed. If a file is divided into a plurality of segments, the integrity of each segment and whether a corresponding segment is a part of the multi-media file should be verified.

A fragmented content verification method based on a Merkle Hash Tree scheme is one of a plurality of schemes that has been proposed to achieve the above verification.

However, in the Merkle Hash Tree scheme, a witness and a signature value are transmitted together with a segment each time the segment is transmitted, and thus, a transmission load is increased. In addition, when the segment is received, a hash value is repeatedly calculated until the number of repeated calculations is a depth of a hash tree−1, and the signature value is verified, and thus, a calculation load is further increased.

SUMMARY

In one general aspect, there is provided a signature device of a validation system, the signature device including a dividing unit to divide content into a plurality of segments, a hash unit to calculate a hash value of each of the plurality of segments, a content hash generating unit to generate a content hash value by performing an exclusive or (XOR) operation with respect to the hash values of the plurality of segments, a signature unit to sign the content hash value with a signature key to generate a signature value, a verification information generating unit to generate verification information for each of the segments by performing an XOR operation with respect to the content hash value with each of the hash values of the plurality of segments, and a packet generating unit to generate a packet for each of the plurality of segments, each packet including a corresponding segment, verification information associated with the corresponding segment, and the signature value.

The hash unit may calculate an initial hash value by hashing the content, and the content hash generating unit may generate the content hash value by performing an XOR operation with respect to the hash values of the plurality of segments and the initial hash value.

In another aspect, there is provided a signature device of a validation system, the signature device including a receiving unit to receive a packet including a segment, verification information associated with the segment, and a signature value, a hash unit to calculate a hash value of the segment by hashing the segment, a content hash determining unit to determine a content hash value by performing an XOR operation with respect to the hash value of the segment and the verification information associated with the segment, and a verifying unit to verify the packet by comparing the content hash value with a verification value that is obtained by decoding the signature value with a public key.

In response to the content hash value being the same as the verification value, the verifying unit may verify that the segment is a part of the content and that the segment has integrity.

The content hash value may be obtained by performing an XOR operation with respect to hash values of a plurality of segments that are included in content.

The content hash value may be obtained by performing an XOR operation with respect to hash values of a plurality of segments included in content and an initial hash value that is obtained by hashing the content.

In another aspect, there is provided a signature device of a validation system, the signature device including a dividing unit to divide content into a plurality of segments, a hash unit to calculate a hash value of each of the plurality of segments, a content hash generating unit to generate a content hash value based on the hash values of the plurality of segments, a signature unit to sign the content hash value with a signature key to generate a signature value, and a verification information generating unit to generate verification information including the hash values of the plurality of segments and the signature value.

The content hash generating unit may perform one of hashing again using the hash values of the plurality of segments as a factor of a hash function to generate the content hash value, connecting and hashing of the hash values of the plurality of segments to generate the content hash value, and an XOR operation with respect to the hash values of the plurality of segments to generate the content hash value.

The hash unit may calculate an initial hash value that is obtained by hashing the content, and the content hash generating unit may perform one of hashing again using the hash values of the plurality of segments and the initial hash value as a factor of a hash function to generate the content hash value, connecting and hashing of the hash values of the plurality of segments and the initial hash value to generate the content hash value, and an XOR operation with respect to the hash values of the plurality of segments and the initial hash value to generate the content hash value.

The verification information generating unit may generate the verification information by further including the initial value.

The signature device may further comprise a transmitting unit to transmit metadata including the verification information, and to transmit a packet including a segment.

In another aspect, there is provided a verification device of a validation system, the verification device including a receiving unit to receive metadata including verification information and a segment, a content hash generating unit to generate a content hash value based on hash values of a plurality of segments, wherein the hash values are included in the verification information, and a verifying unit to verify whether the verification information has integrity by comparing the content hash value with a verification value that is obtained by decoding a signature value included in the verification information with a public key, and, in response to the verification information having integrity, to verify the received segment based on the hash values that are included in the verification information.

The verifying unit may verify that the verification information has integrity if the verification value is the same as the content hash value.

In response to the verification information having integrity, and a hash value of the received segment being the same as a hash value of a corresponding segment included in the verification information, the verifying unit may verify that the received segment is a part of content and that the received segment has integrity.

In another aspect, there is provided a method of performing a signature for verifying content in a signature device, the method including dividing content into a plurality of segments, calculating a hash value of each of the plurality of segments, generating a content hash value by performing an exclusive or (XOR) operation with respect to the hash values of the plurality of segments, generating a signature value by signing the content hash value with a signature key, generating verification information for each of the plurality of segments by performing an XOR operation with respect to each of the hash values of the plurality of segments with the content hash value, and generating a packet for each of the plurality of segments, each packet including a corresponding segment, verification information associated with the corresponding segment, and the signature value.

The method may further comprise calculating an initial hash value by hashing the content, wherein the generating of the content hash value generates the content hash value by performing an XOR operation with respect to the hash values of the plurality of segments and the initial hash value.

In another aspect, there is provided a method of verifying content in a verification device, the method including receiving a packet including a segment, verification information associated with the segment, and a signature value, calculating a hash value of the segment by hashing the segment, determining a content hash value by performing an XOR operation with respect to the hash value of the segment and the verification information, and comparing the content hash value with a verification value that is obtained by decoding the signature value with a public key, and verifying that the segment is a part of content and that the segment has integrity, in response to the content hash value being the same as the verification value.

In another aspect, there is provided a method of performing a signature for verifying content in a signature device, the method including dividing content into a plurality of segments, calculating a hash value of each of the plurality of segments, generating a content hash value based on the hash values of the plurality of segments, generating a signature value by signing the content hash value with a signature key, generating verification information including the hash values of the plurality of segments and the signature value, transmitting, to the verification device, metadata including the verification information, and generating and transmitting a packet including a segment.

In another aspect, there is provided a method of verifying content in a verification device, the method including receiving metadata including verification information, generating a content hash value based on hash values of a plurality of segments, wherein the hash values are included in the verification information, verifying whether the verification information has integrity by comparing the content hash value with a verification value that is obtained by decoding a signature value included in the verification information with a public key, receiving a segment, calculating a hash value of the received segment, and verifying that the received segment is a part of content and that the received segment has integrity, in response to the verification information having integrity and a hash value of the received segment being the same as a hash value of a corresponding segment included in the verification information.

In another aspect, there is provided a signature device for signing each segment of content that comprises a plurality of segments, the signature device including a content hash generator to generate a content hash value based on hash values of each of the plurality of segments, a signature unit to sign the content hash value to generate a signature value, and a packet generator to generate a packet for each respective segment of the plurality of segments, each packet including a respective segment and the signature value of the respective segment.

The content hash generator may generate the content hash value by performing another hash on the hash values of each of the plurality of segments.

The content hash generator may generate the content hash value by performing an exclusive or (XOR) operation using the hash values of the plurality of segments.

The signature device may further comprise a hash unit to perform the hash on the plurality of segments.

The hash unit may further perform an initial hash on content before the content is divided, and the content hash generator generates the content hash value based on the hash values of each of the plurality of segments and the initial hash value.

The signature device may further comprise a verification information generator to generate verification information for each of the plurality of segments, wherein the packet generated by the packet generator further includes the verification information for each respective segment.

The verification information generator may generate verification information by performing an XOR operation using the content hash value and the respective hash values of the plurality of segments.

Other features and aspects may be apparent from the following detailed description, the drawings, and the claims.

BRIEF DESCRIPTION OF THE DRAWINGS

FIG. 11 is a flowchart illustrating another example of a method of a verification process for verifying content.

Figure 1:
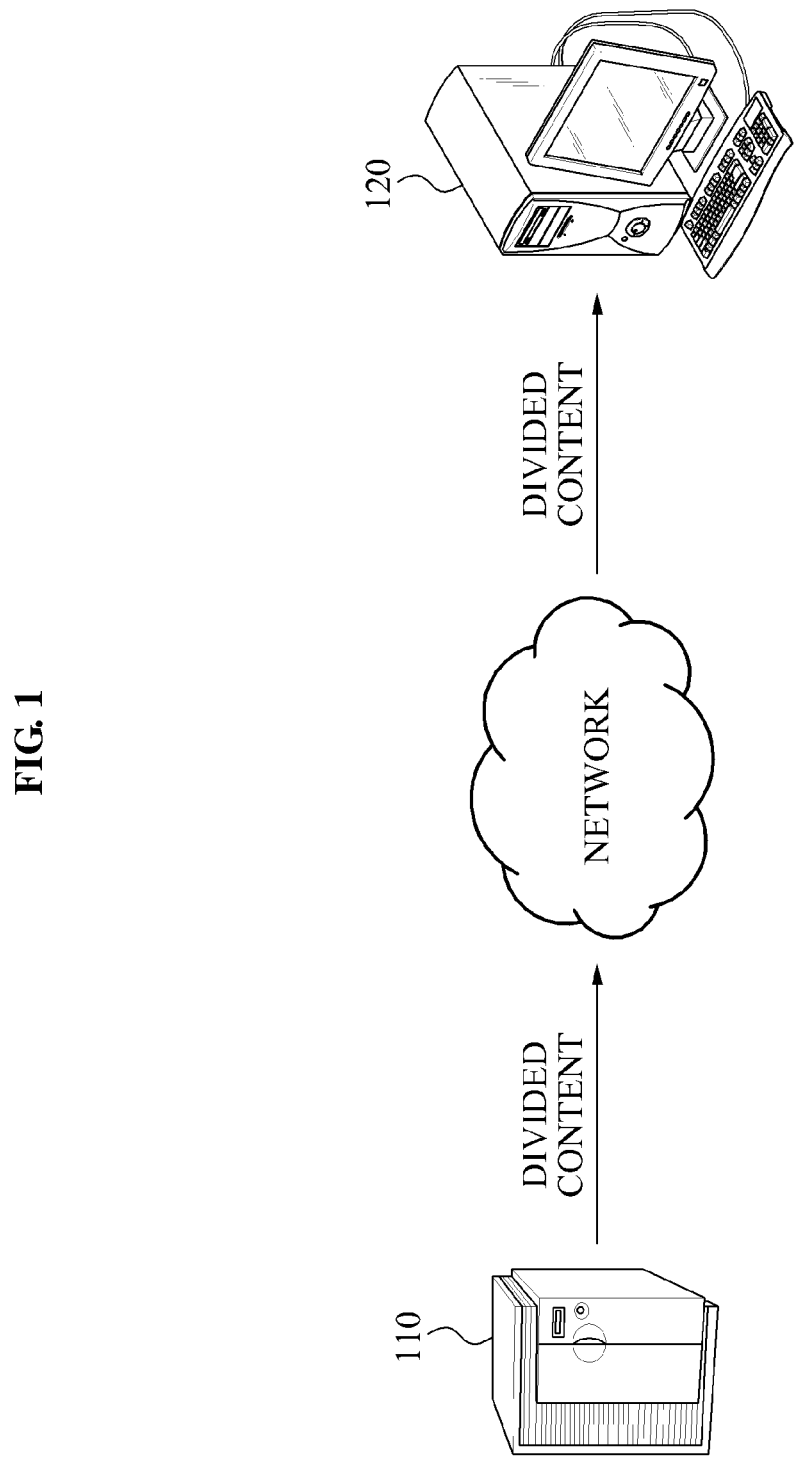
FIG. 1 is a diagram illustrating an example of a validation system that verifies content.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, descriptions of well-known functions and constructions may be omitted for increased clarity and conciseness.

Various examples described herein are directed towards a validation system and method that verifies the integrity of each segment of divided content, when content is transmitted.

FIG. 1 illustrates an example of a validation system that verifies content.

Referring to FIG. 1, the validation system includes a signature device 110 and a verification device 120.

The signature device 110 may generate signature information such as a signature value, and verification information for segments of a divided content. The signature device 110 may verify the integrity of each respective segment and whether each respective segment is a part of the content. For example, the signature device 110 may be a terminal, such as a server, a personal computer, a laptop computer, a mobile phone, a tablet, an MP3 player, and the like.

In response to receiving the segments, the verification device 120 may verify the integrity of each of the respective segments and whether each respective segment is a part of the content, based on the verification information and the signature value that are received from the signature device 110. For example, the verification device 120 may be a terminal, such as a server, a personal computer, a laptop computer, a mobile phone, a tablet, an MP3 player, and the like.

Figure 2:
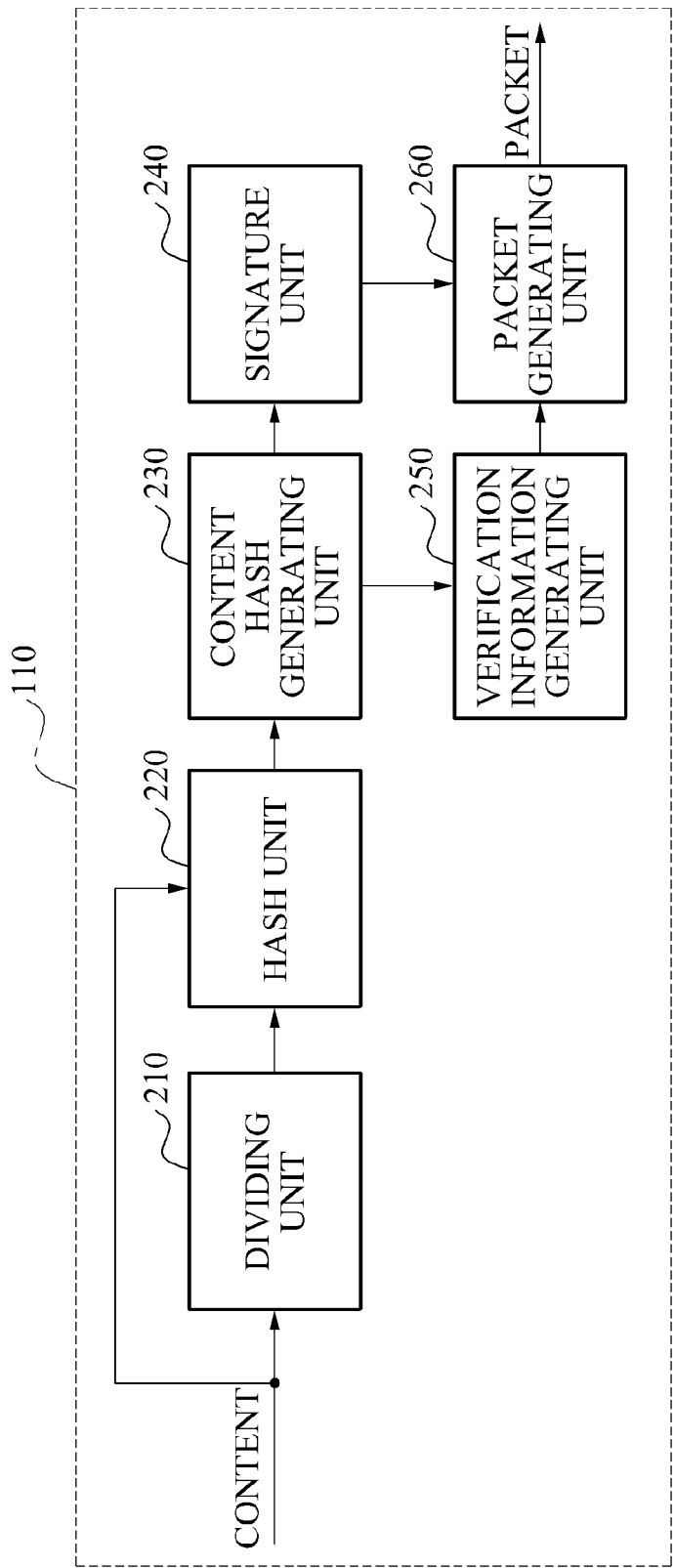
FIG. 2 is a diagram illustrating an example of a signature device that provides for verification of content.

FIG. 2 illustrates an example of a signature device that provides for verification of content.

Referring to FIG. 2, signature device 110 includes a dividing unit 210, a hash unit 220, a content hash generating unit 230, a signature unit 240, a verification information generating unit 250, and a packet generating unit 260. The signature device 110 of FIG. 2 is further described with reference to FIG. 3.

Figure 3:
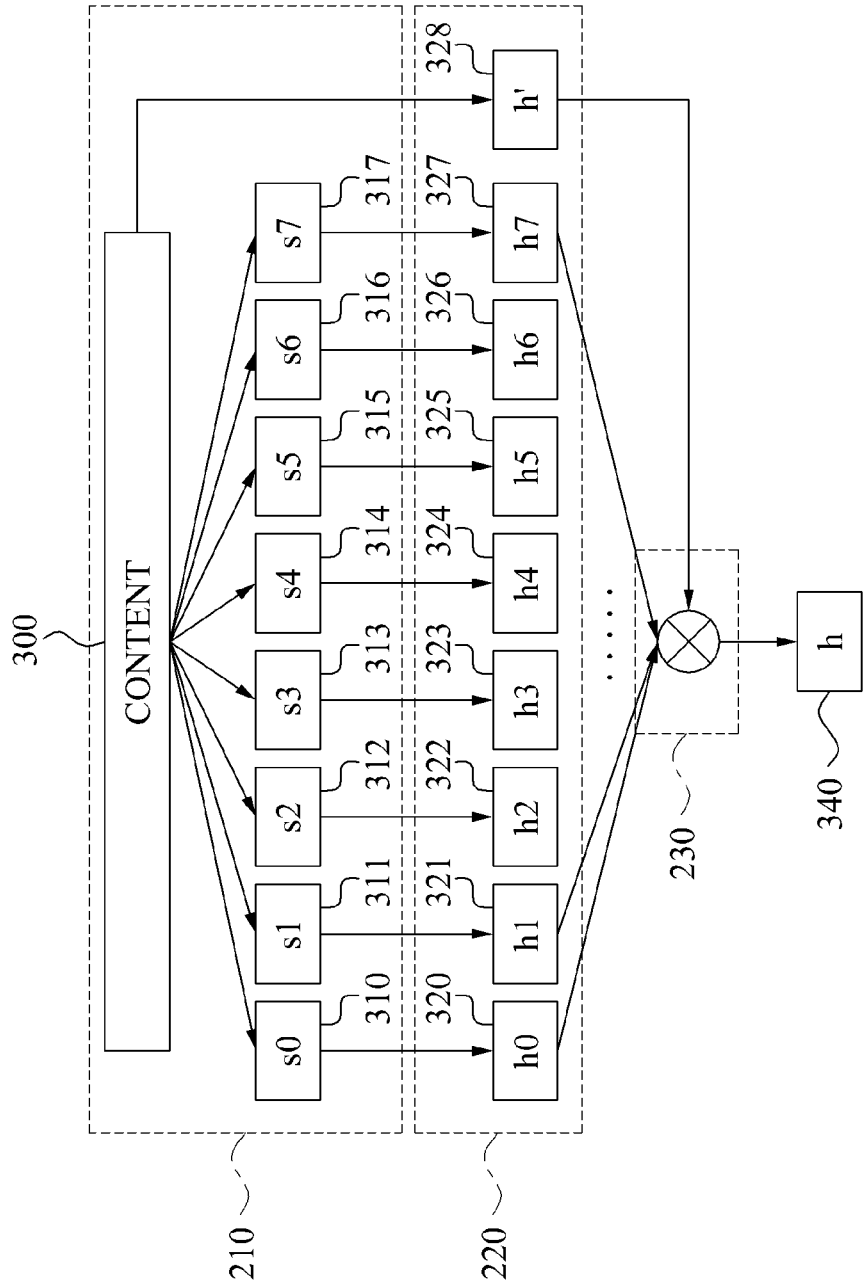
FIG. 3 is a diagram illustrating an example of a process that generates a content hash value for verification information in the signature device of FIG. 2.

FIG. 3 illustrates an example of a process that generates a content hash value for verification information in the signature device of FIG. 2.

The dividing unit 210 may divide content 300 into a plurality of segments, for example, segments 310 through 317.

The hash unit 220 may calculate hash values 320 through 327 for the plurality of segments 310 through 317, respectively. The hash unit 220 may calculate an initial hash value 328 by hashing the content 300 before the content is divided.

The content hash generating unit 230 may generate a content hash value 340, for example, by performing an exclusive or (XOR) operation with respect to the hash values 320 through 327 of the plurality of segments 310 through 317. As another example, the content hash generating unit 230 may generate the content hash value 340 by performing an XOR operation with respect to the hash values 320 through 327 of the plurality of segments 310 through 317 and with respect to an initial hash value 328.

The signature unit 240 may generate a signature value by signing the content hash value 340 with a signature key.

The verification information generating unit 250 may generate verification information for each of the respective plurality of segments 310 through 317 by performing an XOR operation with respect to the content hash value 340 with each of the respective hash values 320 through 327 of the plurality of segments 310 through 317.

For each respective segment of segments 310 through 317, packet generating unit 260 may generate a packet including a respective segment, verification information associated with the respective segment, and the signature value. For example, the packet generating unit 260 may generate the packet as expressed by Equation 1.

$$s_i \| (h_i \text{ XOR } h) \| \text{sign}(h) \qquad \text{[Equation 1]}$$

In Equation 1, $s_i$ corresponds to an $i^{th}$ segment, $h_i$ corresponds to a hash value of an $i^{th}$ segment, h corresponds to the content hash value, and sign(h) corresponds to the signature value that is obtained by signing the content hash value with a signature key of a content distributor.

Figure 4:
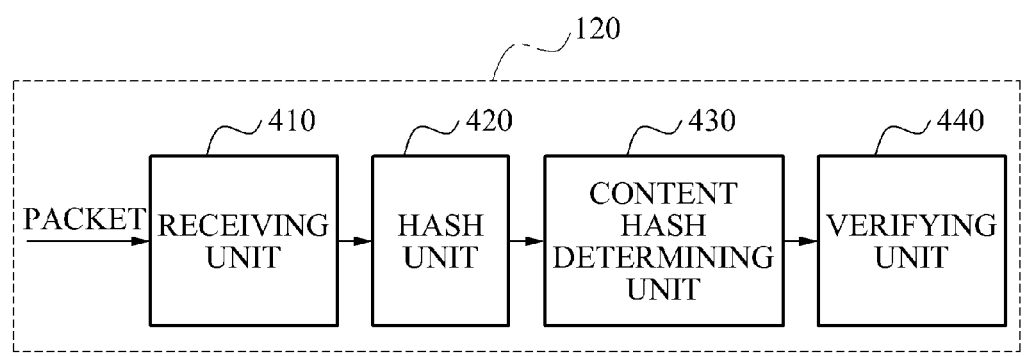
FIG. 4 is a diagram illustrating an example of a verification device that verifies content.

FIG. 4 illustrates an example of the verification device that verifies content.

Referring to FIG. 4, verification device 120 includes a receiving unit 410, a hash unit 420, a content hash determining unit 430, and a verifying unit 440.

The verifying unit 410 may receive a packet. For example, the received packet may include a segment, verification information that is associated with the segment, and a signature value. The hash unit 420 may calculate a hash value of the segment by hashing the segment. The content hash determining unit 430 may determine a content hash value by performing an XOR operation with respect to the hash value of the segment and the verification information that is associated with the segment.

The verifying unit 440 may verify the packet by comparing the determined content hash value with a verification value. For example, the verification value may be obtained by decoding the signature value with a public key of a content distributor. In response to the verification value being the same as the determined content hash value, the verifying unit 440 may verify the integrity of the segment and that the segment included in the packet is a part of the content.

Figure 5:
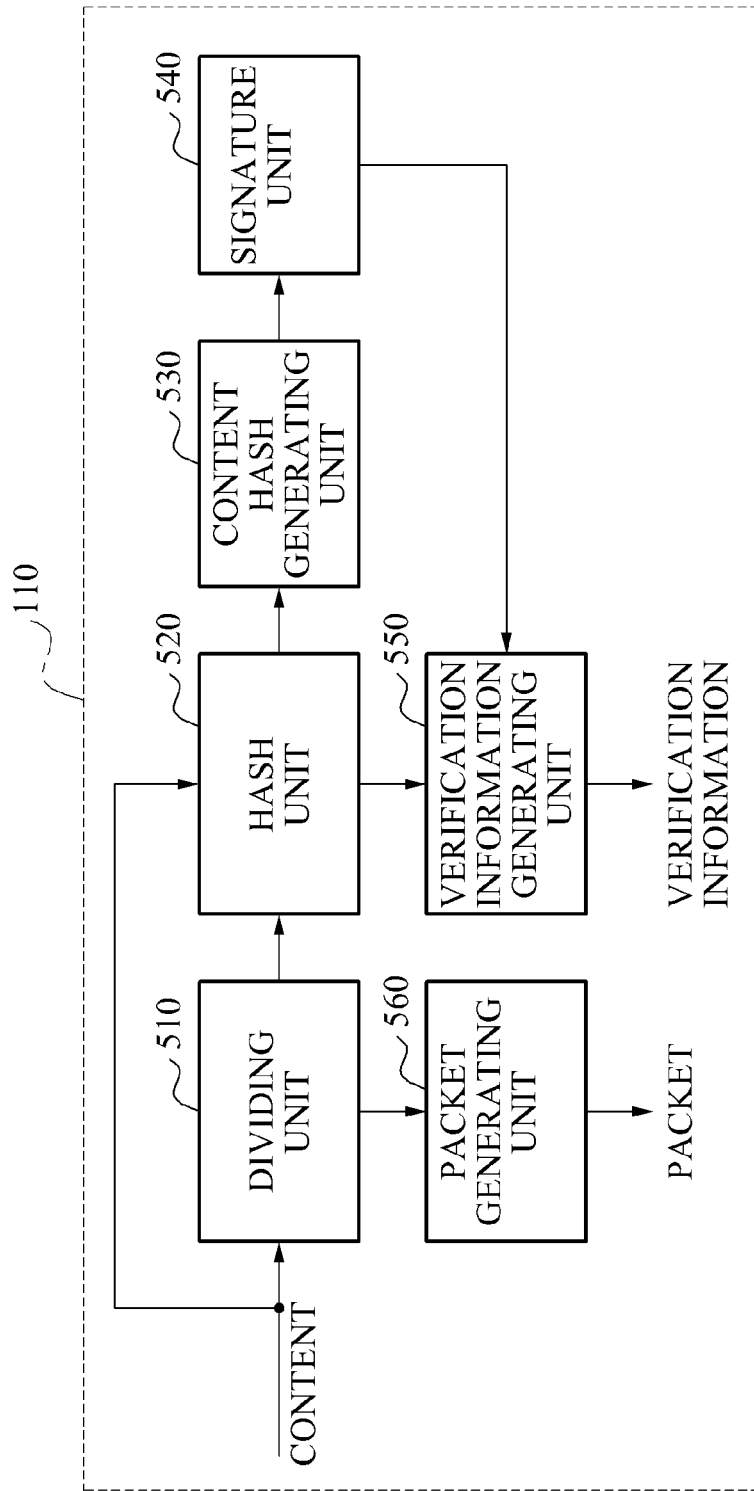
FIG. 5 is a diagram illustrating another example of a signature device that provides verification of content.

FIG. 5 illustrates another example of a signature device that provides verification of content.

Referring to FIG. 5, signature device 110 includes a dividing unit 510, a hash unit 520, a content hash generating unit 530, a signature unit 540, a verification information generating unit 550, and a packet generating unit 560. The signature device 110 of FIG. 5 is further described with reference to FIG. 6.

Figure 6:
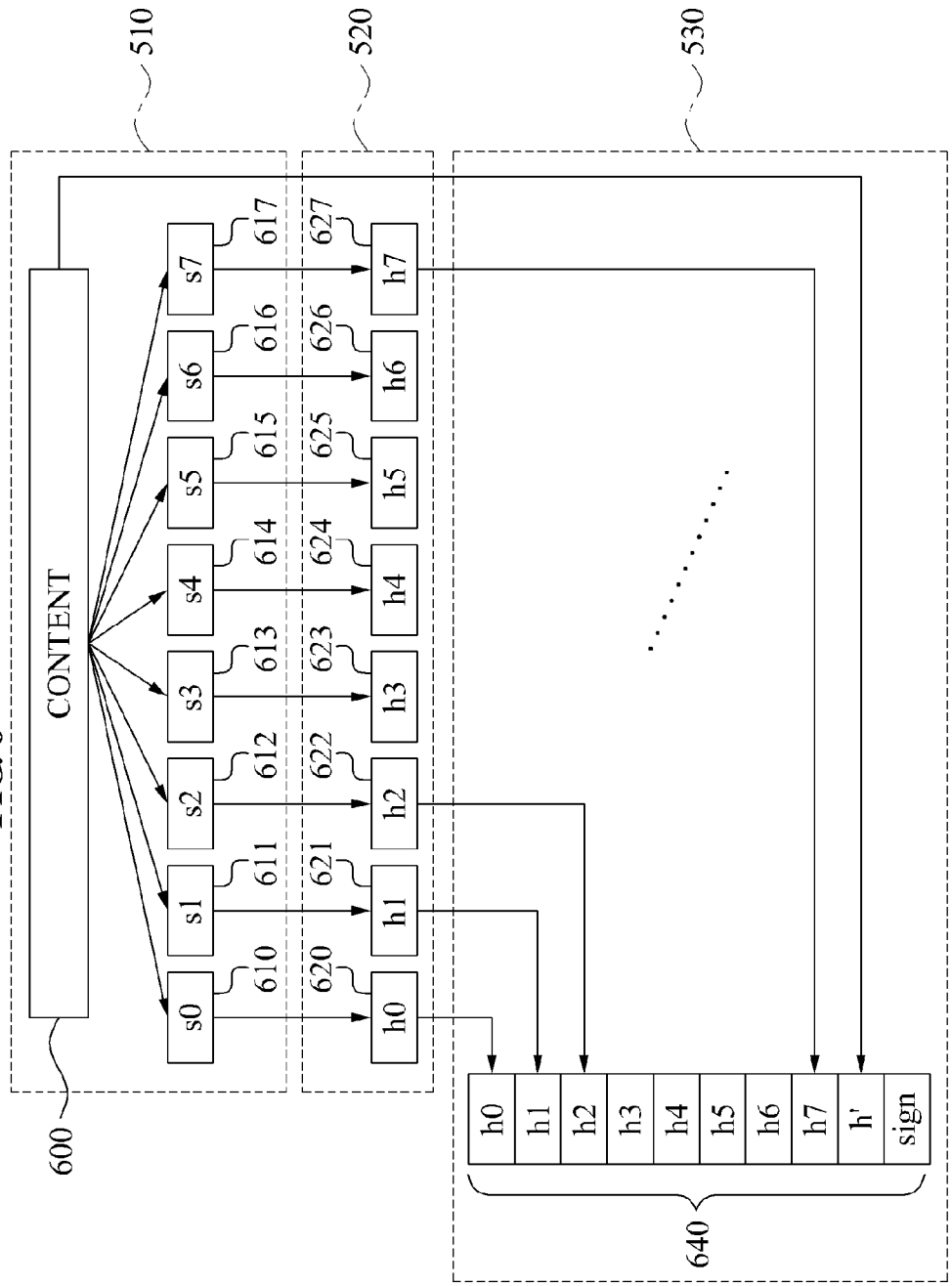
FIG. 6 is a diagram illustrating an example of a process that generates verification information in the signature device of FIG. 5.

FIG. 6 illustrates an example of a process that generates verification information in the signature device of FIG. 5.

The dividing unit 510 may divide a content 600 into a plurality of segments, for example, segments 610 through 617.

The hash unit 520 may calculate hash values 620 through 627 of the plurality of segments 610 through 617, respectively. The hash unit 520 may calculate an initial hash value by hashing the content 600 before the content is divided.

The content hash generating unit 530 may generate a content hash value based on the hash values 620 through 627 of the plurality of segments 610 through 617. As another example, the content hash generating unit 530 may generate the content hash value by performing another hash using the hash values 620 through 627 of the plurality of segments 610 through 617 as a factor of a hash function. The content hash generating unit 530 may generate the content hash value by connecting and hashing the hash values 620 through 627 of the plurality of segments 610 through 617. For example, the content hash generating unit 530 may generate the content hash value by performing an XOR operation with respect to the hash values 620 through 627 of the plurality of segments 610 through 617.

As another example, the content hash generating unit 530 may generate the content hash value by performing hashing using the hash values 620 through 627 of the plurality of segments 610 through 617 and the initial hash value as a factor of a hash function. The content hash generating unit 530 may generate the content hash value by connecting and hashing the hash values 620 through 627 of the plurality of segments 610 through 617 and the initial hash value. For example, the content hash generating unit 530 may generate the content hash value by performing an XOR operation with respect to the hash values 620 through 627 of the plurality of segments 610 through 617 and the initial hash value.

The signature unit 540 may generate a signature value by signing the content hash value generated by the content hash generating unit 530. For example, the signature unit 540 may sign the content hash value using a signature key.

The verification information generating unit 530 may generate the verification information 640 including respective hash values 620 through 627 of the plurality of segments 610 through 617 and the signature value.

The packet generating unit 560 may generate a packet that includes at least one segment, and may transmit the generated packet to the verification device 120.

Figure 7:
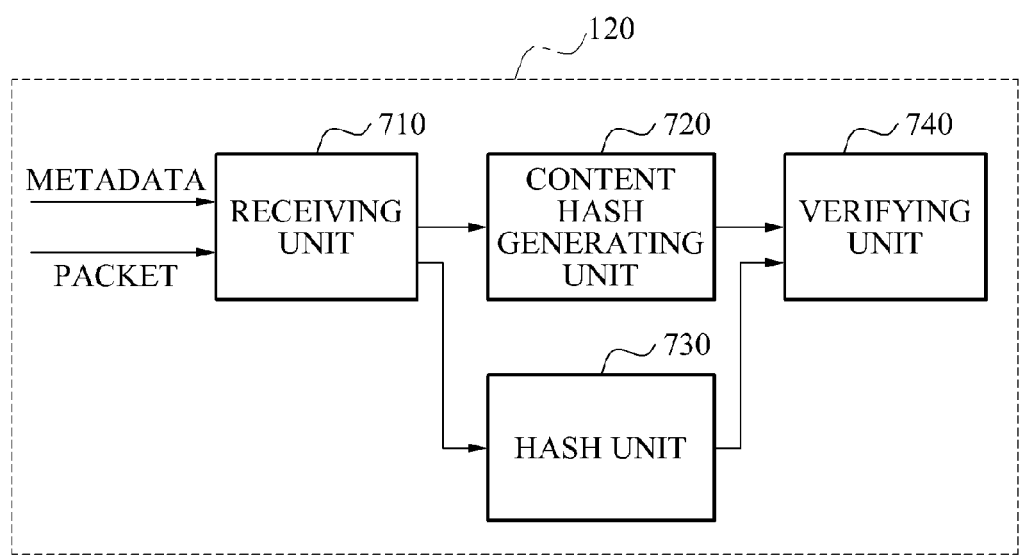
FIG. 7 is a diagram illustrating another example of a verification device that verifies content.

FIG. 7 illustrates another example of the verification device that verifies content.

Referring to FIG. 7, the verification device 120 includes a receiving unit 710, a content hash generating unit 720, a hash unit 730, and a verifying unit 740.

The receiving unit 710 may receive data, for example, metadata that includes verification information and a packet that includes a segment. In this example, the metadata may be received before the packet, or may be received along with the packet. For example, the metadata may be included in the packet.

The content hash generating unit 720 may generate a content hash value that is based on hash values of a plurality of segments. The hash values may be included in the verification information.

The hash unit 730 may perform hashing of the segment received by the receiving unit 710.

The verifying unit 740 may verify whether the verification information has integrity by comparing the content hash value with a verification value. In this example, the verification value may be obtained by decoding a signature value included in the verification information with a public key. In response to the verification information having integrity, the verifying unit 740 may verify the received segment based on the hash values of the plurality of segments.

In response to a hash value of the received segment being the same as a hash value of a corresponding segment included in the verification information, the verifying unit 740 may verify that the segment included in the received packet is a part of the content and that the segment has integrity.

In various aspects described herein, a high-capacity content may be divided and transmitted for transmission of the high-capacity content, and integrity of each segment of a divided content may be verified.

Figure 8:
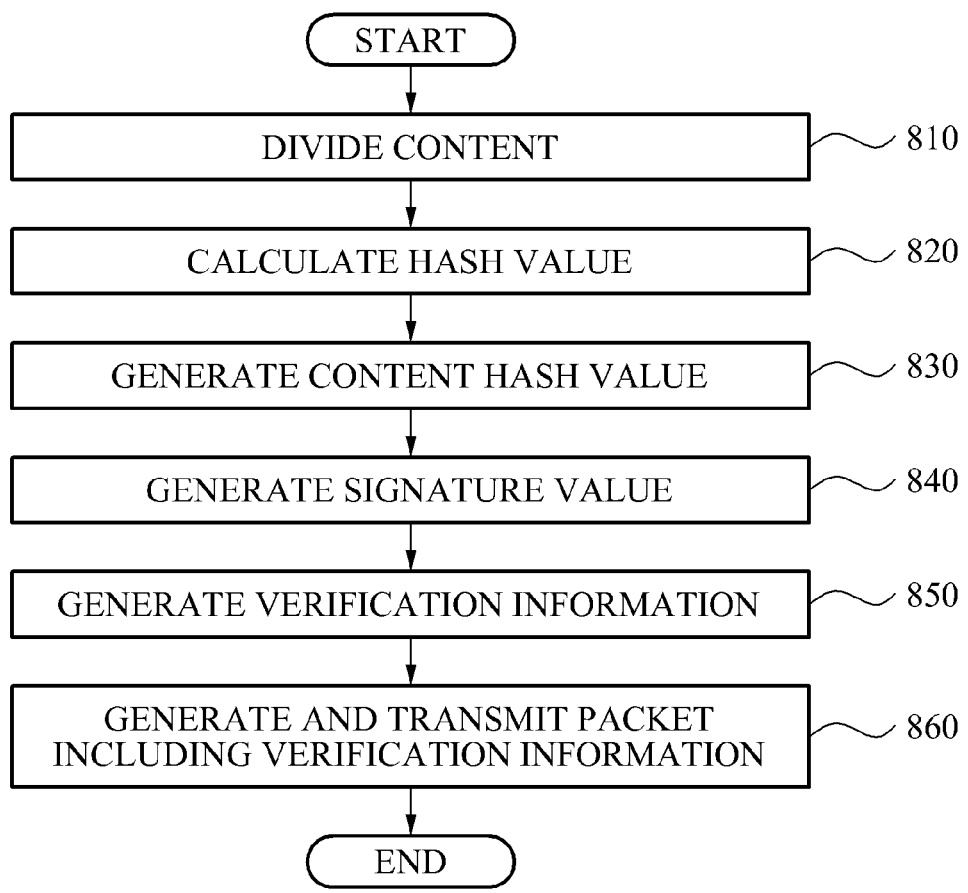
FIG. 8 is a flowchart illustrating an example of a method of a signature process that provides for verification of content.

FIG. 8 illustrates an example of a method of a signature process that provides for verification of content.

Referring to FIG. 8, the signature device 110 divides content into a plurality of segments, in 810. The signature device 110 calculates a hash value of each of the plurality of segments, in 820.

The signature device 110 generates a content hash value by performing an XOR operation with respect to the hash values of the plurality of segments, in 830. For example, the signature device 110 may calculate an initial hash value by hashing the content, and may generate the content hash value by performing an XOR operation with respect to the hash values of the plurality of segments and the initial hash value.

The signature device 110 generates a signature value by signing the content hash value with a signature key, in 840.

The signature device 110 generates verification information for each of the plurality of segments, in 850. For example, the signature device 110 may generate verification information by performing an XOR operation with respect to each of the hash values of the plurality of segments with the content hash value.

For each segment, the signature device 110 generates a packet including verification information and transmits the packets, in 860. For example, the signature device 110 may generate, for each of the plurality of segments, a packet including a corresponding segment, the verification information associated with the corresponding segment, and the signature value, and may transmit the generated packet to the verification device 120.

Figure 9:
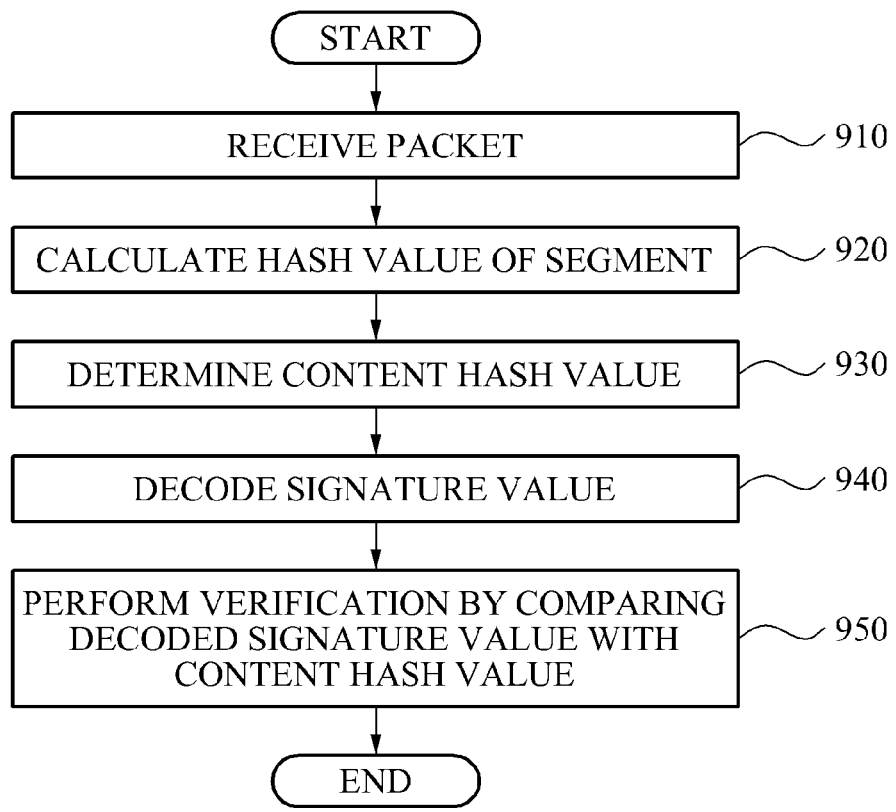
FIG. 9 is a flowchart illustrating an example of a method of a verification process for verifying content.

FIG. 9 illustrates an example of a method of a verification process for verifying content.

Referring to FIG. 9, the verification device 120 receives a packet including a segment, verification information associated with the segment, and a signature value, in 910. The verification device 120 calculates a hash value by hashing the received segment, in 920. The verification device 120 determines a content hash value by performing an XOR operation with respect to the hash value of the segment and the verification information that is associated with the segment.

In 940, the verification device 120 decodes a signature value included in the verification information with a public key. The verification device 120 compares the content hash value with a verification value that is obtained by decoding the signature value with a public key, and, in response to the verification value being the same as the content hash value, the verification device 120 verifies that the segment is a part of the content and that the segment has integrity, in 950.

Figure 10:
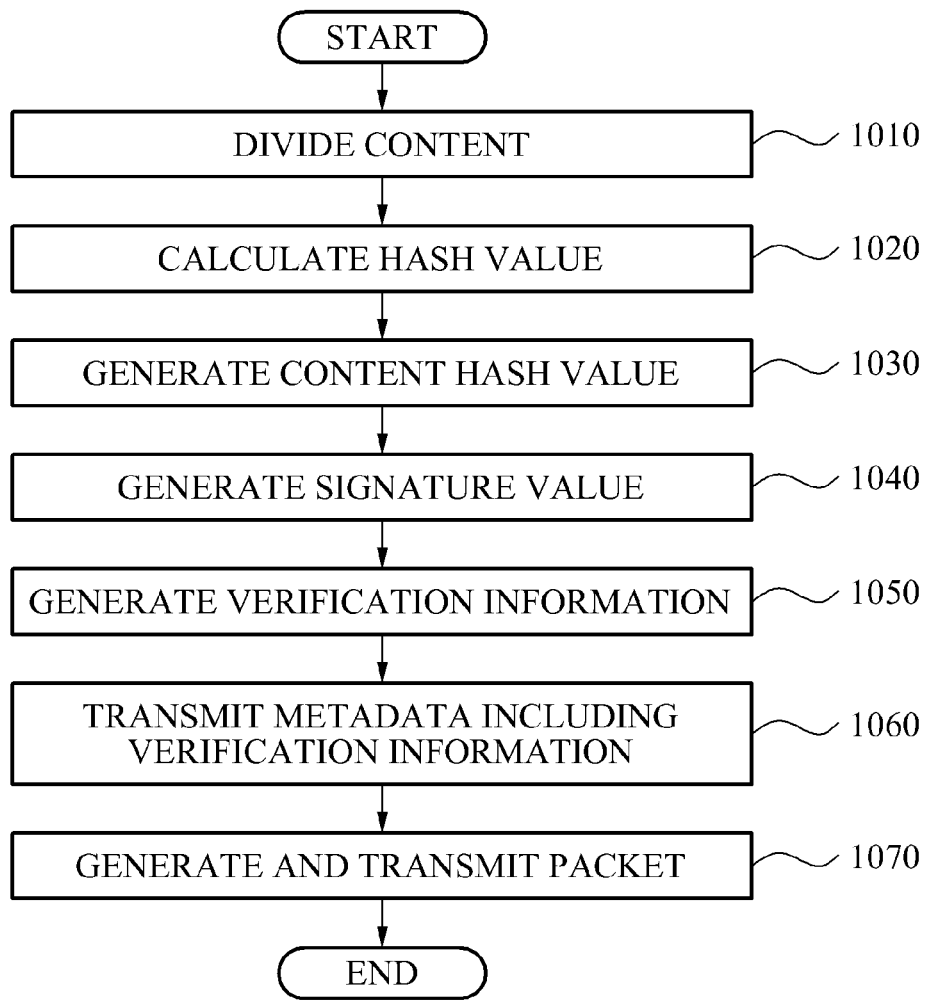
FIG. 10 is a flowchart illustrating another example of a method of a signature process that provides for verification of content.

FIG. 10 illustrates another example of a method of a signature process that provides for verification of content.

Referring to FIG. 10, the signature device 110 divides content into a plurality of segments, in 1010.

The signature device 110 calculates a hash value of each of the plurality of segments, in 1020. The signature device 110 generates a content hash value based on the hash values of the plurality of segments, in 1030. The signature device 110 generates a signature value by signing the content hash value with a signature key, in 1040.

The signature device 110 generates verification information including hash values of the segments and the signature value, in 1050. The signature device 110 transmits, to the verification device 120, metadata that includes the verification information, in 1060. The signature device 110 generates a packet including at least one segment, in 1070.

FIG. 11 illustrates another example of a method of a verification process for verifying content.

Referring to FIG. 11, the verification device 120 receives metadata including verification information, in 1110. The verifying device 120 generates the content hash value based on hash values of a plurality of segments, in 1120. The hash values may be included in the verification information.

The verification device 120 decodes a signature value included in the verification information with a public key, in 1130. The verification device 120 verifies whether the verification device has integrity by comparing the content hash value with the verification value, in 1140. In response to the verification information having integrity, the verification device 120 receives a segment, in 1150. The verification device 120 calculates a hash value of the received segment, in 1160.

The verification device 120 verifies that the received segment is a part of the content and that the received segment has integrity, in 1170, in response to the verification information having integrity and a hash value of the received segment being the same as a hash value of a corresponding segment included in the verification information.

If the verification information does not have integrity or if the hash value of the received segment is different from the hash value of the corresponding segment included in the verification information, the verification device 120 may verify that the segment has an error and may terminate a corresponding algorithm.

Various examples described herein are directed towards a validation system and method that may verify integrity of each segment of divided content, in response to a high-capacity content being divided and transmitted. The validation system and method may calculate a content hash value based on hash values of segments, may generate verification information and a signature value based on the content hash value, and may verify the verification information and signature value. Accordingly, a transmission load and a calculation load may decrease.

The processes, functions, methods, and/or software described herein may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The program instructions recorded on the media may be those specially designed and constructed, or they may be of the kind well-known and available to those having skill in the computer software arts. Examples of computer-readable storage media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules that are recorded, stored, or fixed in one or more computer-readable storage media, in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, the terminal device described herein may refer to mobile devices such as a cellular phone, a personal digital assistant (PDA), a digital camera, a portable game console, an MP3 player, a portable/personal multimedia player (PMP), a handheld e-book, a portable laptop personal computer (PC), a global positioning system (GPS) navigation, and devices such as a desktop PC, a high definition television (HDTV), an optical disc player, a setup box, and the like, capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described herein. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A signature device of a validation system, the signature device comprising:
 a processor comprising:
 a dividing unit to divide content into a plurality of segments;
 a hash unit to calculate an initial hash value by hashing the content before the content is divided and to calculate a hash value of each of the plurality of segments;
 a content hash generating unit to generate a content hash value by performing an exclusive or (XOR) operation with respect to the hash values of the plurality of segments and the initial hash value;
 a signature unit to sign the content hash value with a signature key to generate a signature value;
 a verification information generating unit to generate verification information for each of the segments by performing an XOR operation with respect to the content hash value with each of the hash values of the plurality of segments; and a packet generating unit to generate a packet for each of the plurality of segments, each packet including a corresponding segment, verification information associated with the corresponding segment, and the signature value.

2. The signature device of claim 1, wherein the packet generating unit is further configured to generate the packet for each of the plurality of segments based on the following equation:

si ∥(hi XOR h) ∥sign(h), where si corresponds to an $i^{the}$ segment, hi corresponds to the hash value of the $i^{th}$ segment, h corresponds to the content hash value, and sign(h) corresponds to the signature value obtained by signing the content hash value with the signature key.

3. A verification device of a validation system, the signature device comprising:
a processor comprising:
a receiving unit to receive a packet including a segment, verification information associated with the segment, and a signature value;
a hash unit to calculate a hash value of the segment by hashing the segment;
a content hash determining unit to determine a content hash value by performing an XOR operation with respect to the hash value of the segment and the verification information associated with the segment; and
a verifying unit to verify the packet by comparing the content hash value with a verification value that is obtained by decoding the signature value with a public key,
wherein the verification information is obtained by performing an XOR operation with respect to hash value of a plurality of segments that are included in content, an initial hash value by hashing the content, and a hash value of the received segment.

4. The signature device of claim 3, wherein the verifying unit is further configured to verify an integrity of each of the segments and whether each segment is a part of the content based on the verification information and the signature value received from the signature device.

5. The signature device of claim 3, wherein, in response to the content hash value being the same as the verification value, the verifying unit verifies that the segment is a part of the content and that the segment has integrity.

6. The signature device of claim 3, wherein the content hash value is obtained by performing an XOR operation with respect to hash values of a plurality of segments that are included in content.

7. The signature device of claim 3, wherein the content hash value is obtained by further performing an XOR operation with respect to hash values of a plurality of segments included in content and an initial hash value that is obtained by hashing the content.

8. A signature device of a validation system, the signature device comprising:
a processor comprising:
a dividing unit to divide content into a plurality of segments;
a hash unit to calculate an initial hash value by hashing the content before the content is divided and to calculate a hash value of each of the plurality of segments;

a content hash generating unit to generate a content hash value based on the hash values of the plurality of segments and the initial hash value;
a signature unit to sign the content hash value with a signature key to generate a signature value; and
a verification information generating unit to generate verification information including the hash values of the plurality of segments and the signature value.

9. The signature device of claim 8, wherein the content hash generating unit performs one of:
hashing again using the hash values of the plurality of segments as a factor of a hash function to generate the content hash value;
connecting and hashing of the hash values of the plurality of segments to generate the content hash value; and
an XOR operation with respect to the hash values of the plurality of segments to generate the content hash value.

10. The signature device of claim 8, wherein:
the content hash generating unit performs one of:
hashing again using the hash values of the plurality of segments and the initial hash value as a factor of a hash function to generate the content hash value;
connecting and hashing of the hash values of the plurality of segments and the initial hash value to generate the content hash value; and
an XOR operation with respect to the hash values of the plurality of segments and the initial hash value to generate the content hash value.

11. The signature device of claim 10, wherein the verification information generating unit generates the verification information by further including the initial value.

12. The signature device of claim 8, further comprising:
a transmitting unit to transmit metadata including the verification information, and to transmit a packet including a segment.

13. A verification device of a validation system, the verification device comprising:
a processor comprising:
a receiving unit to receive metadata including verification information and a segment;
a content hash generating unit to generate a content hash value based on hash values of a plurality of segments, wherein the hash values are included in the verification information; and
a verifying unit to verify whether the verification information has integrity by comparing the content hash value with a verification value that is obtained by decoding a signature value included in the verification information with a public key, and, in response to the verification information having integrity, to verify the received segment based on the hash values that are included in the verification information,
wherein the verification information is obtained by performing an XOR operation with respect to hash value of a plurality of segments that are included in content, an initial hash value by hashing the content, and a hash value of the received segment.

14. The verification device of claim 13, wherein the verifying unit verifies that the verification information has integrity if the verification value is the same as the content hash value.

15. The verification device of claim 13, wherein, in response to the verification information having integrity, and a hash value of the received segment being the same as a hash value of a corresponding segment included in the verification information, the verifying unit verifies that the received segment is a part of content and that the received segment has integrity.

16. A method of performing a signature for verifying content in a signature device by a processor, the method comprising:
   dividing content into a plurality of segments;
   calculating an initial hash value by hashing the content before the content is divided and to calculate a hash value of each of the plurality of segments;
   generating a content hash value by performing an exclusive or (XOR) operation with respect to the hash values of the plurality of segments and the initial hash value;
   generating a signature value by signing the content hash value with a signature key;
   generating verification information for each of the plurality of segments by performing an XOR operation with respect to each of the hash values of the plurality of segments with the content hash value; and
   generating a packet for each of the plurality of segments, each packet including a corresponding segment, verification information associated with the corresponding segment, and the signature value.

17. A method of verifying content in a verification device by a processor, the method comprising:
   receiving a packet including a segment, verification information associated with the segment, and a signature value;
   calculating a hash value of the segment by hashing the segment;
   determining a content hash value by performing an XOR operation with respect to the hash value of the segment and the verification information; and
   comparing the content hash value with a verification value that is obtained by decoding the signature value with a public key, and verifying that the segment is a part of content and that the segment has integrity, in response to the content hash value being the same as the verification value,
   wherein the verification information is obtained by performing an XOR operation with respect to hash values of a plurality of segments that are included in content, an initial hash value by hashing the content, and hash value of the received segment.

18. A method of performing a signature for verifying content in a signature device by a processor, the method comprising:
   dividing content into a plurality of segments;
   calculating an initial hash value by hashing the content before the content is divided and to calculate a hash value of each of the plurality of segments;
   generating a content hash value based on the hash values of the plurality of segments and the initial hash value;
   generating a signature value by signing the content hash value with a signature key;
   generating verification information including the hash values of the plurality of segments and the signature value;
   transmitting, to the verification device, metadata including the verification information; and
   generating and transmitting a packet including a segment.

19. A method of verifying content in a verification device by a processor, the method comprising:
   receiving metadata including verification information;
   generating a content hash value based on hash values of a plurality of segments, wherein the hash values are included in the verification information;
   verifying whether the verification information has integrity by comparing the content hash value with a verification value that is obtained by decoding a signature value included in the verification information with a public key;
   receiving a segment;
   calculating a hash value of the received segment; and
   verifying that the received segment is a part of content and that the received segment has integrity, in response to the verification information having integrity and a hash value of the received segment being the same as a hash value of a corresponding segment included in the verification information,
   wherein the verification information is obtained by performing an XOR operation with respect to hash values of a plurality of segments that are included in content, an initial hash value by hashing the content, and a hash value of the received segment.

* * * * *